United States Patent

Czarnecki et al.

[11] Patent Number: 5,982,164
[45] Date of Patent: Nov. 9, 1999

[54] DOPPLER TRIANGULATION TRANSMITTER LOCATION SYSTEM

[75] Inventors: Steven V. Czarnecki, Appalachia; James A. Johnson, Newark Valley; Carl Gerst, Skirentelos, all of N.Y.

[73] Assignee: Lockheed Martin Corporation, Bethesda, Md.

[21] Appl. No.: 09/087,145

[22] Filed: May 29, 1998

Related U.S. Application Data

[62] Division of application No. 08/731,193, Oct. 7, 1996, Pat. No. 5,874,918.

[51] Int. Cl.$^6$ .................................................. G01R 23/02
[52] U.S. Cl. ...................... 324/76.33; 324/752; 364/819
[58] Field of Search ............................ 324/76.26, 76.33, 324/76.52, 76.53, 532; 364/819, 820, 824

[56] References Cited

U.S. PATENT DOCUMENTS

| | | | |
|---|---|---|---|
| 3,621,223 | 11/1971 | Aleff et al. | 324/76.33 |
| 3,694,643 | 9/1972 | Smith | 324/76.33 |
| 3,750,152 | 7/1973 | Waful | 324/76.83 |
| 3,903,407 | 9/1975 | Burnham | 324/76.33 |
| 3,987,443 | 10/1976 | Cross | 324/76.26 |
| 4,037,151 | 7/1977 | Takeuchi | 324/76.33 |
| 4,110,572 | 8/1978 | Cochrane | 324/532 |

OTHER PUBLICATIONS

Skolnik, "Introduction to Radar Systems", Scientific Library, 1980, McGraw–Hill, Inc., pp. 369–376, month unavailable.

*Primary Examiner*—Diep Do
*Attorney, Agent, or Firm*—Robert P. Cogan; Lane, Aitken and McCann

[57] ABSTRACT

In a system for locating the position of a transmitter, a platform containing an antenna is moved through a measurement path. The frequency received by the antenna is measured at measurement points distributed along a measurement path. The frequency is measured by cross correlating coherent pulses of the received frequency signal. An inertial navigation system on the platform indicates the position of the measurement path. A computer determines estimated locations by non-linear least squares convergence starting from trial locations. The non-linear least squares convergence is based on the frequency equation for the received frequency $$f = f_o + \frac{f_o}{C}\bar{V} \cdot \frac{\bar{r}}{|\bar{r}|}$$

in which $f_0$, is the transmitter frequency, $\bar{V}$ is the antenna velocity and $\bar{r}$ is the range of the transmitter. The computer evaluates a cost function derived from the frequency equation, for each location estimated by the non-linear least squares convergence and selects the estimated location with the lowest cost function as the best solution.

4 Claims, 4 Drawing Sheets

DOPPLER TRIANGULATION TRANSMITTER LOCATION SYSTEM

CROSS REFERENCE TO RELATED APPLICATION

This application is a divisional of U.S. application Ser. No. 08/731,193, filed Oct. 7, 1996 U.S. Pat. No. 5,874,918.

This invention relates to a system for locating the position of a transmitter by Doppler triangulation.

BACKGROUND OF THE INVENTION

Conventional techniques for estimating the location of a transmitter, such as direction finding triangulation, make use of line of bearing measurements, while the relative position of the transmitter and the platform from which the estimation is made changes. By knowing the geographic coordinates of the platform, the geographic coordinates of the transmitter can be estimated. In order to obtain an accurate measurement of the location of a transmitter from line of bearing measurements, there needs to be substantial relative cross range motion between the platform and the transmitter and this cross range motion requires time for the motion to be carried out. For many practical applications, the prior art techniques of locating the transmitter do not provide a solution to the problem with adequate performance. Particularly in some military applications, the speed and accuracy of the prior art systems are not satisfactory. The present invention provides a system which significantly improves the speed and accuracy of determining the solution of the transmitter location.

SUMMARY OF THE INVENTION

In the Doppler triangulation system of the invention, no direct measurements of the line of bearing of the transmitter is made. Instead, the frequency of the transmitted signal received by a platform moving relative to the transmitter is measured at specific instants of time as the platform moves through a measurement path.

The location of a transmitter is determined by making use of the change in frequencies received by the platform caused by Doppler effect. The frequency of the signal received by an antenna moving relative to a transmitter can be represented in vector notation as follows:

$$f = f_0 - \frac{f_0}{C}\left(\overline{V} \cdot \frac{\overline{r}}{|\overline{r}|}\right) \quad (1)$$

in which f is the detected frequency, $f_0$ is the transmitter frequency being detected, C is the rate of travel of the signal in the transmitting median, i.e., the speed of light in the case of a radio signal, $\overline{V}$ is the velocity of the antenna, $\overline{r}$ is the range vector from the transmitter to the antenna. The expression of Equation (1) can be written in scaler form as follows:

$$f = f_0 - \frac{f_0}{C} V \cos\theta \quad (2)$$

wherein V is the scaler velocity of the antenna and $\theta$ is the angle between the range vector and the direction of travel of the antenna. If a constant drift in the transmitter frequency is assumed, then the expression for the measured frequency becomes:

$$f = f_0 + f_d t - \frac{f_0}{C}\left(\overline{V} \cdot \frac{\overline{r}}{|\overline{r}|}\right) \quad (3)$$

in which $f_d$ is the drift rate and t is the elapsed time.

In accordance with the invention, the frequency detected by the antenna is repeatedly measured as the platform carries the antenna through a measurement path to provide a series of frequency measurements distributed at measurement points along the measurement path. An inertial navigation system continuously tracks the position and attitude of the platform and from this information, the position, velocity and bore site of the antenna is tracked through the measurement path.

The average direction of the boresight of the antenna during the flight through the measurement path is determined and two trial locations at widely separated positions are selected on the side of the platform corresponding to the average boresight direction. A third trial location will be a previously estimated position for the transmitter if one is available. A non-linear least squares convergence based on Equation (1) or Equation (3) is attempted starting from each trial location. For each location to which convergence is achieved, a cost function, based on Equation (1) or Equation (3), is evaluated. The location with the lowest cost function is selected as the estimated location for the transmitter.

When the transmitted signal is a radar signal, the signal will be in the form of clusters of pulses, each pulse having a waveform at the frequency to be measured. The frequency of the transmitted signal is detected by cross correlating the pulses in each cluster to determine the elapsed time and the elapsed phase module $2\pi$ between each pair of cross correlated pulses. The frequency is then determined from the elapsed time and phase determinations.

DESCRIPTION OF A PREFERRED EMBODIMENT

Figure 1:
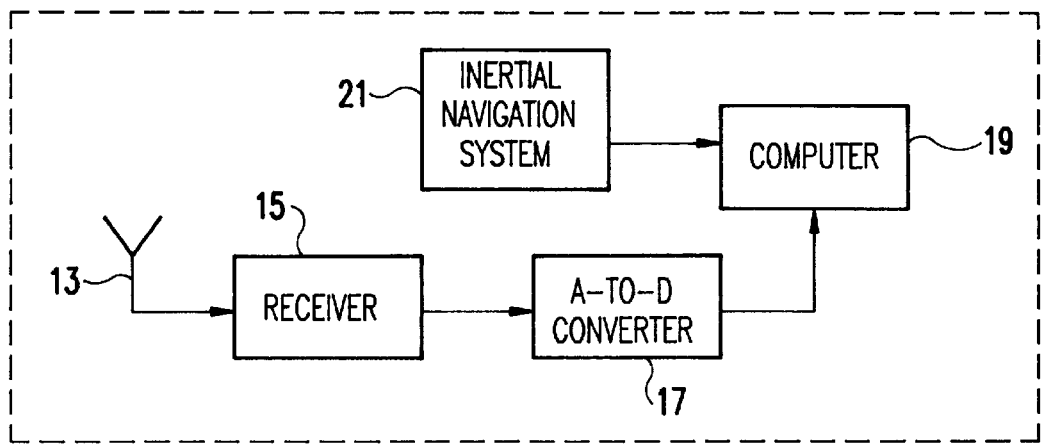
FIG. 1 is a block diagram of the system of the invention.

As shown in FIG. 1, the system of the invention comprises a platform 11, such as an aircraft, on which an antenna 13 is mounted. The platform holds a RF receiver 15, such as a radar receiver, for receiving a transmitted signal and converting the received signal to an IF signal, an A-to-D converter 17 which converts the IF signal to digital values representing amplitudes and phases of successive samples of the IF signal, a computer 19 for computing the position in accordance with the position determining algorithm of the invention, and an inertial navigation system 21 which continuously tracks the location and attitude of the platform 11. The specific embodiment of the invention represented in FIG. 1 is designed to receive and operate on radar signals varying from 0.5 gigahertz to 20 gigahertz. The receiver 15 includes a frequency converter making use of a local oscillator to reduce the detected frequency of the received signal to about 160 megahertz. The receiver also applies a digital signal to the computer representing the local oscillator frequency of the receiver. The digital values representing the phase samples of the pulses may be provided by a phase analog-to-digital converter as disclosed in U.S. Pat. No. 4,405,895.

Figure 2:
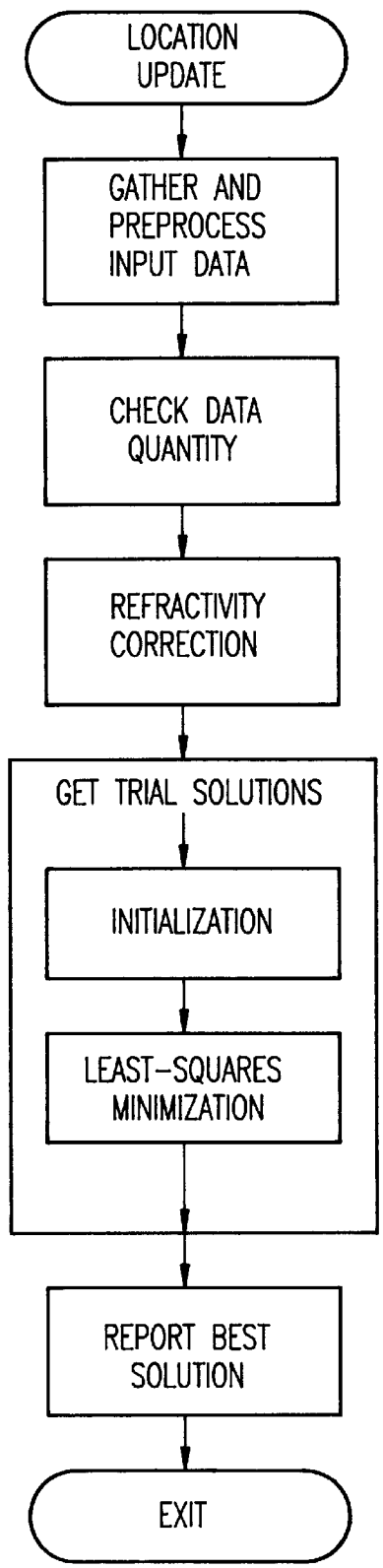
FIG. 2 is a flow chart of the computer program used in the system of FIG. 1 to acquire data and compute the estimated location of a transmitter.
Figure 3:
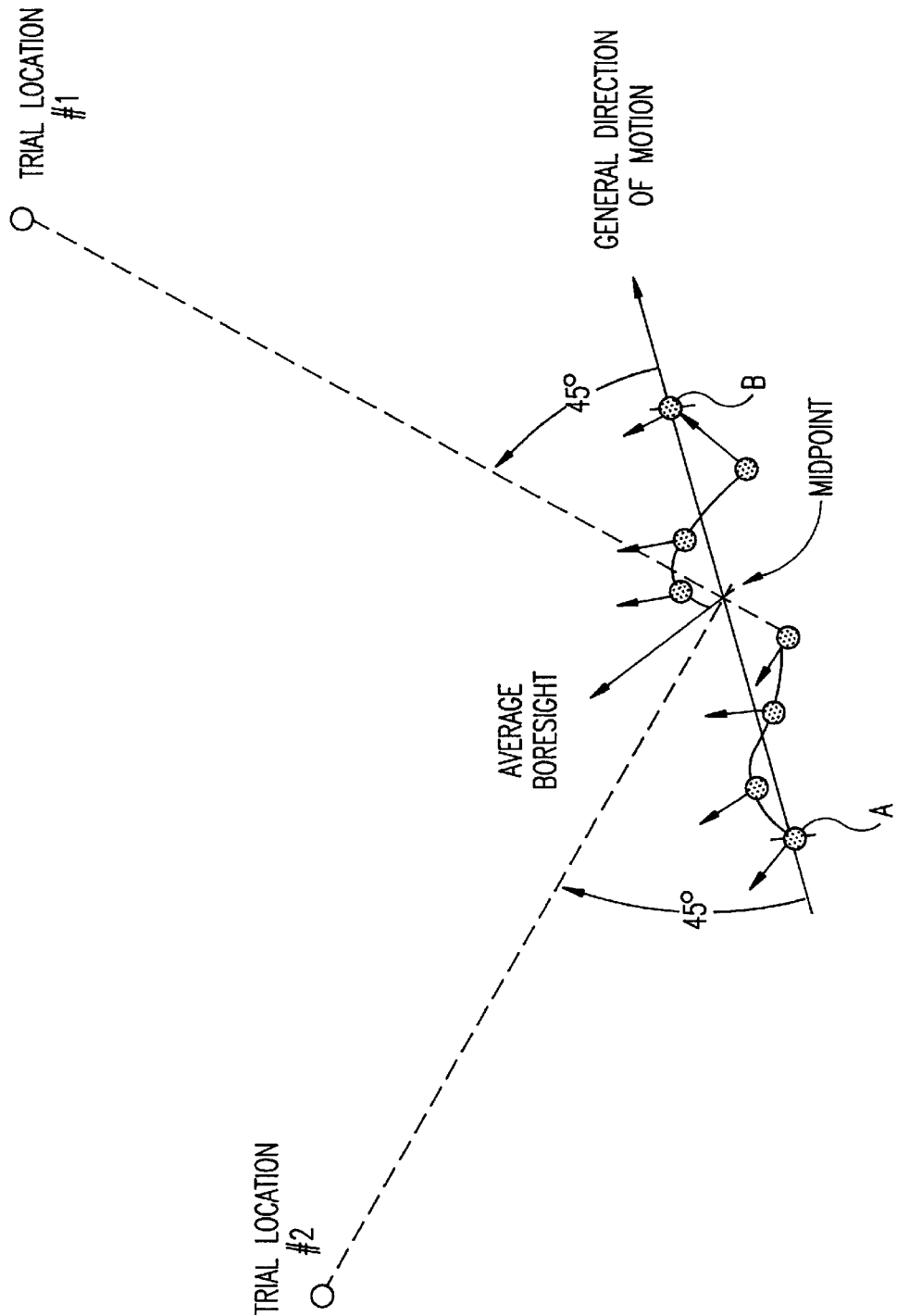
FIG. 3 is a diagram illustrating the operation of the system of the invention.

The flow chart shown in FIG. 2 illustrates the process carried out by the computer to locate the transmitter from the received data. As shown in FIG. 2, the first step of the algorithm is to gather and preprocess the input data as the platform travels on a measurement path as shown in FIG. 3. As the platform, or, more precisely, the antenna mounted on the platform, travels through a measurement path from point A to point B, radar pulses in clusters will be received from a transmitter. Each cluster will correspond to a different measurement point on the measurement path with the measurement points distributed over the measurement path from point A to point B. The measured points do not need to be uniformly distributed along the measurement path. The computer will receive digital values representing the amplitudes and phases of the pulses in the received clusters. From these digital values, the computer determines a representative frequency for each measurement point corresponding to a cluster and assigns a navigation tag to each cluster. The navigation tag comprises data obtained from the inertial navigation system and will be the position of the antenna at each measurement point and the boresight direction of the antenna at each measurement point.

Following the step of gathering and preprocessing the data, a check is made to determine whether or not sufficient data is present to make an accurate determination of the transmitter position. This check includes confirming, that the number of clusters being processed exceeds a selected minimum, that the clusters were received over a time span that exceeds a selected minimum, and that the spacing between the clusters did not exceed a selected maximum. If the data quantity is insufficient as determined in this step, execution of the position determining algorithm is postponed until more clusters are obtained.

Following the step of checking the data quantity, the Z coordinate in the XYZ coordinate system is corrected for refractivity. After the refractivity correction, the process carries out the algorithm of locating the transmitter using the model of Equation (1) or (3). In the initialization portion of the location determining algorithm, two trial locations are arbitrarily selected as shown in FIG. 3, one at 45 degrees from the mid point of the vector between points A and B in the forward direction and the second trial location 45 degrees from the mid point of the direction vector in the aft direction. These points are placed along the left or right side of the flight path based on the average antenna boresight direction during the data collection. As pointed about above, a third trial location corresponds to a previously estimated transmitter location if one is available. A non-linear least squares convergence is attempted from each trial location using the model of Equation (1) or Equation (3). After convergence, the best solution is chosen by evaluating a cost function for each solution. The cost function is also based on the model of Equation (1) or Equation (3). Following the cost function evaluation, the location of the XY coordinates of the transmitter with the lowest cost function is reported and displayed.

Figure 4:
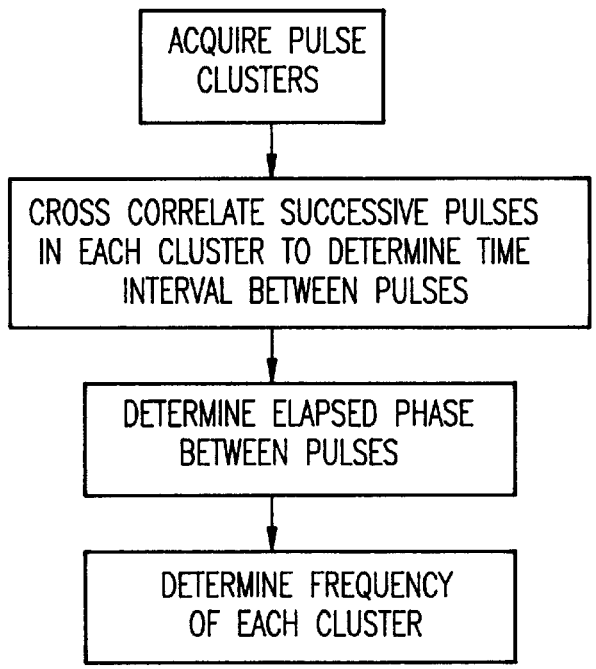
FIG. 4 is a flow chart illustrating the data acquisition portion of the computer program in more detail.

As shown in the flow chart of FIG. 4, in the preferred embodiment of the invention, the gather and preprocess data step involves acquiring a series of clusters of pulses detected by the antenna over a measurement interval during which the platform is moving through the measurement path. Each cluster comprises a series of coherent pulses received over a short time interval of a few milliseconds up to 100 milliseconds. The fact that the pulses are coherent means that each pulse starts at the same point in the carrier waveform cycle. Stated mathematically, coherency means that $$\frac{1}{T_n} = \frac{1}{N} fo$$

in which $T_n$ is the elapsed time between the pulse samples and N is an integer. Navigation data provided by the inertial navigation system on the platform indicates the location of the platform and the attitude of the platform at the time the cluster is received or, more specifically, at a time reference assigned specifically to the cluster. From this location, the location, velocity and boresight of the antenna is determined at the time of each measurement point corresponding to a cluster of pulses.

The A-to-D converter provides the computer with a series of amplitude and phase waveform samples of the received IF signal during each pulse of each cluster. To obtain a frequency measurement for a cluster, the waveform of each pulse of the cluster is cross-correlated with the succeeding pulse in the cluster. The frequency to be measured is the carrier frequency of the pulse waveform, which is much higher than the pulse repetition frequency in the cluster. The cross-correlation function yields a set of cross-correlation values for different time displacements between the pulses and these sets of values will have a maximum at the time displacement $\Delta T$ equal to the actual time interval between successive pulses. More specifically, when the first pulse is cross-correlated with the second pulse, a value $\Delta T$ will be determined corresponding to the time interval between the start of the first pulse and the start of the second pulse. An indication of the elapsed phase or phase difference between the start of the first pulse and the start of the second pulse can be determined from the correlation function:

$$C_{12}(\Delta T) = e^{i\Delta\Phi} A^2 \qquad (4)$$

in which $C_{12}(\Delta T)$ is the magnitude of the correlation function for the time displacement $\Delta t$ between the two pulses and $\Delta\Phi$ represents the elapsed phase or phase difference between the two pulses. From Equation (4), an indication of the elapsed phase $\Delta\Phi$ can be determined in modulo $2\pi$. If the elapsed phase were known completely, the frequency could be determined directly from the equation:

$$f = \frac{\Delta\phi}{2\pi\Delta T}$$

In view of the fact that $\Delta\Phi$ can be determined in modulo $2\pi$ from Equation (4), can be represented $\Delta\Phi$ as follows:

$$[\Delta\phi = \widetilde{\Delta\phi} + n2\pi] \qquad (5)$$

in which $\widetilde{\Delta\phi}$ represents the modulo $2\pi$ value of $\Delta\Phi$ and n is an unknown integer. Accordingly, the frequency of the waveform of the pulses of the cluster can be represented as:

$$f = \frac{\Delta\tilde{\phi} + n2\pi}{2\pi\Delta T} = \frac{\Delta\tilde{\phi}}{2\pi\Delta T} + \frac{n2\pi}{\Delta T} \qquad (6)$$

Thus, the formula for frequency has an ambiguity of $1/\Delta T$. In accordance with the invention, some of the ambiguity is resolved by using successive pairs of the pulses in the cluster to create a series of ambiguous expressions for the frequency as follows:

$$f = \frac{\Delta\tilde{\phi}_1 + n_1 2\pi}{2\pi\Delta T_1} = \frac{\Delta\tilde{\phi}_2 + n_2 2\pi}{2\pi\Delta T_2} = \ldots \frac{\Delta\tilde{\phi}_k + n_k 2\pi}{2\pi\Delta T_k} \qquad (7)$$

In Equation (7), the $\widetilde{\Delta\phi}_1$ through $\widetilde{\Delta\phi}_k$ represent the modulo phase values determined from the cross correlation of each successive pair of pulses in the cluster, $\Delta T_1$ through $\Delta T_k$ are the time intervals between each successive pair of pulses in the cluster and $n_1$ through $n_k$ are the corresponding unknown integers for each successive pair of pulses. Only some of the values $n_1$ through $n_k$ will satisfy Equation (7) and, accordingly, the ambiguity is reduced to a subset of $n_1$–$n_k$. To eliminate the remaining ambiguity, the slope of the phase change of each pulse is measured making use of the phase samples of the pulse waveform to provide a coarse estimate of the frequency. If the coarse estimate of the frequency is insufficiently accurate to resolve the remaining ambiguity, then one of the frequency solutions is arbitrarily selected as the frequency for the cluster and a corresponding frequency is selected for each of the clusters so that if one of the ambiguous frequencies is selected, the same corresponding ambiguous frequency will be selected for every cluster. The selected frequencies are then used in the transmitter location algorithm to determine the location of the transmitter. The algorithm will determine the correct location for the transmitter as long as all the frequencies correspond to the same ambiguity because the measurement of transmitter location comes from the value of $\Delta f$, the Doppler change in frequency due to motion of the platform, and this value will be the same for each corresponding set of the ambiguous frequencies. In fact, every ambiguous frequency represents an actual spectral component of the transmitted waveform.

The above system of determining the frequency lends itself to radar signal transmissions because the signal is transmitted in clusters of coherent pulses. The system can also be applied to a continuous signal transmission by acquiring clusters of coherent pulse samples of the transmitted waveform and cross correlating the pulse samples.

The frequency determined by the above-mentioned process for each of the clusters will be an intermediate frequency represented by the difference between the transmitter carrier frequency and the local oscillator frequency plus a Doppler shift frequency component.

The intermediate frequency measurements are corrected for variations in the local oscillator frequency caused by the local oscillator acceleration as indicated by the inertial guidance system. As a result of this correction, each frequency measurement will correspond to that which would be detected with a local oscillator that is insensitive to acceleration.

In the preferred embodiment of the invention, the frequency measurements used in the transmitter location algorithm are corrected intermediate frequencies, wherein the equation models (1) and (3) on which the algorithm is based express the frequency detected by the antenna. Since after correction for acceleration, the intermediate frequency measurements have a constant offset from the frequencies detected by the antenna, the corrected intermediate frequency measurements can be used directly in the algorithm because the constant local oscillator offset cancels out.

Figure 5:
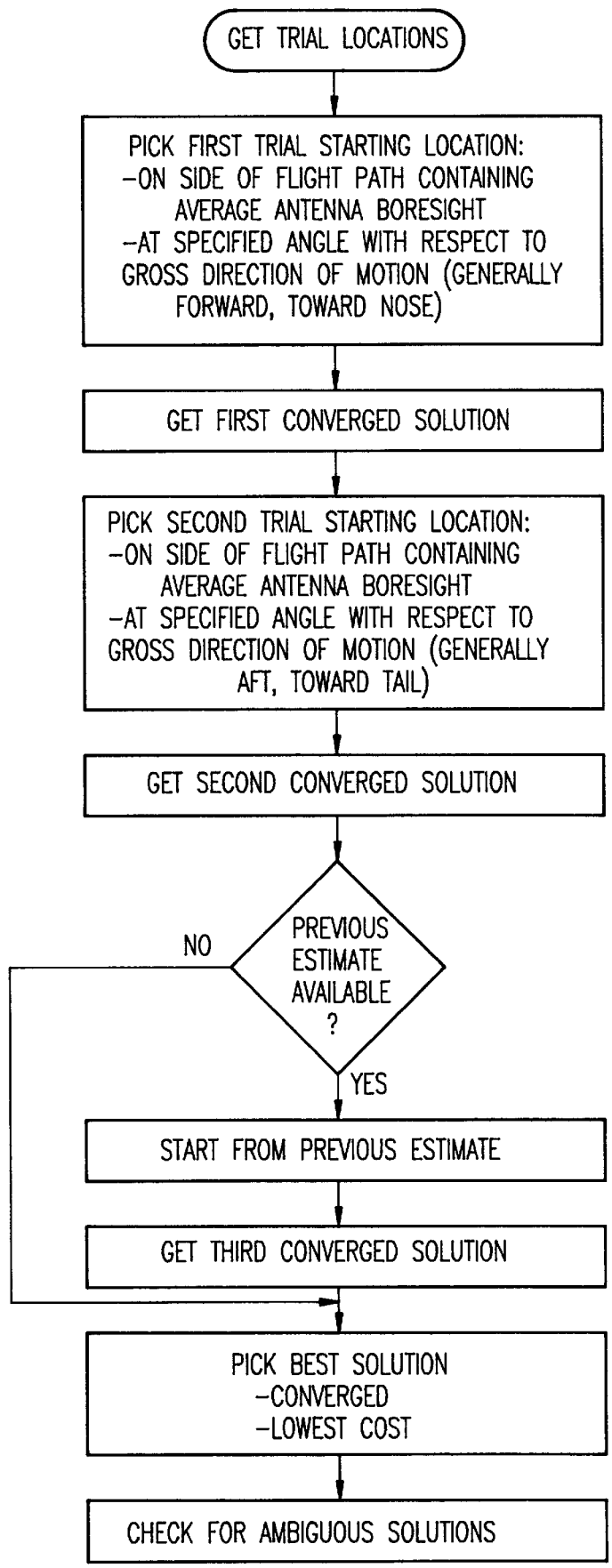
FIG. 5 is a flow chart illustrating the transmitter location portion of the computer program in more detail.

FIG. 5 illustrates a flow chart of the algorithm for determining the transmitter location from frequency measurements determined at the measurement points distributed along the measurement path as described above. The algorithm uses the signal model of Equation (3) which is repeated below:

$$f = f_0 + f_d t - \frac{f_0}{C}\left(\bar{V} \cdot \frac{\bar{r}}{|\bar{r}|}\right) \qquad (3)$$

In Equation (3), the unknowns are the coordinates X and Y of the transmitter, $f_0$, and $f_d$ and can be expressed as a vector $\bar{x}$:

$$\bar{x} = \{X, Y, f_0, f_d\} \qquad (8)$$

Accordingly, the frequency measurements may be expressed as a function of $\bar{x}$ as follows:

$$f(\bar{x}) = f_0 + f_d t - \frac{f_0}{C}\left(\bar{V} \cdot \frac{\bar{r}}{|\bar{r}|}\right) \qquad (9)$$

The algorithm performs a nonlinear least squares estimate of $\bar{x}$ starting from two or three trial locations. As shown in FIG. 3, one of the trial positions will be displaced 45 degrees from the gross direction of the motion of the platform at a selected range and a second trial position will be displaced 135° from the gross direction of motion of the platform. The average antenna boresight direction is used to determine if the trial locations should be placed to the left or right side of the flight path. The boresight used in this selection is the average boresight of the antenna as determined by the inertial navigation system for each of the measurement points. If the previous location of the transmitter determined by the system is available, this previous position will be used as a third trial position for the transmitter. The least squares algorithm is represented as:

$$\bar{x}_{n+1} = \bar{x}_n + \overline{\Delta x} \qquad (12)$$

in which $\bar{x}_n$ represents the estimated values of the unknowns, X, Y, $f_0$ and $f_d$, $\overline{\Delta x}$ are the set of corrections added to the estimated unknowns $\bar{x}$, and $\bar{x}_{n+1}$ are the estimated values of the unknowns after a set of corrections have been added. The initial values of the unknowns $\bar{x}_1$ are the X and Y coordinates of the trial locations, $f_0$ is set initially to be the mean frequency measurement measured at the measurement points and $f_d$ is initially set to zero. $\overline{\Delta x}$, representing a correction in the value of X, Y $f_0$ and $f_d$ to be added to the initial values in accordance with Equation (10), is determined in accordance with the following expression:

$$\overline{\Delta x} = (H^T R^{-1} H)^{-1} H^T R^{-1} \bar{z} \qquad (11)$$

in which H is a matrix of partial derivatives expressed as follows:

$$H \equiv \left.\frac{\partial}{\partial \bar{x}} f(\bar{x})\right|_{\hat{x}} \qquad (12)$$

The partial derivatives of Equation 12 are:

$$\frac{\partial f(\overline{x})}{\partial X}, \frac{\partial f(\overline{x})}{\partial (Y)}, \frac{\partial f(\overline{x})}{\partial (fo)}, \frac{\partial (f\overline{x})}{\partial (fd)}. \quad (13)$$

Each column of the matrix H is made up of a vector of one of the partial derivatives comprising evaluations of the partial derivative at each of the measurement points based on the predicted values of the unknowns $\overline{x}$. In expression (11), $\overline{z}$ is a vector representing the difference between the measured frequency values and a set of predicted frequency measurements for currently estimated by the latest iteration of the least squares calculation. The vector $\overline{z}$ can be expressed as follows:

$$\overline{z} = \overline{f}_m - \overline{f}(\hat{x}) \quad (14)$$

In Equation (14), $\overline{f}_m$ is a vector representing the frequency measurements at the measurement points distributed along the measurement path and $\overline{f}(\hat{x})$ is a vector of the predicted frequency measurements at each of the measurement points. The predicted frequency measurements are determined from Equation (3) using the X and Y coordinates, fo, and fd from the latest calculation of $\overline{x}$. The matrix R in Expression (11) is a covariance matrix of the estimated error in the frequency measurements and in this application consists of a diagonal matrix in which the values are the frequency measurement variances. The frequency measurement errors at the different measurement points are assumed to be uncorrelated. After $x_1$ has been corrected to be $x_2$ in accordance with Equation (12), the process is repeated with the new $\Delta x$ until the expression (13) converges, at which point a location will have been estimated for the transmitter.

For each estimated location to which convergence is achieved as described above, a cost function is evaluated. The cost function evaluated is expressed as follows:

$$S = \overline{z}^T R^{-1} \overline{z} \quad (15)$$

The estimated locations are sorted by cost and the location with the lowest cost function is selected as the best solution.

An ambiguity check is then performed and if no ambiguity is found, the estimated location with the lowest cost function is reported and displayed. If more than one valid solution has been obtained in the least squares estimation, and if the valid solutions have nearly equal cost. and are not colocated, this means that the best solution determined by the cost evaluation is ambiguous and it is reported and displayed, but the ambiguity is indicated.

Thus, as described above, the system quickly determines the X and Y coordinates of the transmitter after the platform is moved through the measurement path.

The specific embodiment described above detects the position of a radio transmitter from a moving platform, presumably an air craft. The radio transmitter typically would be a radar transmitter, but the system can be used with equal facility to determine the position of the transmitter of radio signals used in communication. In addition, the system can be adapted to detect the position of a sonar transmitter or a sound signal when making the signal receiver a transducer for converting the transmitted sound wave into an electric signal.

These and other modifications can be made to the specific embodiment of the invention as described above without departing from the spirit and scope of the invention.

We claim:

1. A method for measuring the carrier frequency of a cluster of pulses, wherein each pulse of the cluster is transmitted with a carrier waveform having the frequency to be measured, comprising cross correlating a first set of the pulses of the cluster with a second set of pulses of the cluster to determine for each pair of cross correlated pulses the elapsed time, $\Delta T$, between such pair of pulses, determining the elapsed phase, $\Delta \Phi$, modulo $2\pi$, of the carrier waveform between each pair of cross correlated pulses, and determining said frequency from the $\Delta \Phi$ modulo $2\pi$ determinations and from the values of $\Delta T$.

2. A method as recited in claim 1, wherein each pulse of the cluster is cross correlated with the succeeding pulse in the cluster.

3. A method of measuring the carrier frequency of a transmitted waveform comprising acquiring a cluster of pulse samples of said waveform, cross-correlating a first set of said pulse samples with a second set of pulse samples to determine the elapsed time, $\Delta T$, between each pair of cross correlated pulse samples, determining the elapsed phase, $\Delta \Phi$, modulo $2\pi$, of the carrier waveform between each pair of cross correlated samples and determining the frequency of said waveform from the $\Delta \Phi$ modulo $2\pi$ determinations and the $\Delta T$ determinations.

4. A method as recited in claim 3, wherein each pulse sample of said cluster is cross correlated with the succeeding pulse sample in said cluster.

* * * * *